Aug. 4, 1959  H. D. KESLING  2,897,598
DENTAL APPLIANCE
Filed March 5, 1957

INVENTOR:
HAROLD D. KESLING
BY
Marzall, Johnston, Cook + Root.
ATT'YS

United States Patent Office 2,897,598
Patented Aug. 4, 1959

2,897,598

DENTAL APPLIANCE

Harold D. Kesling, La Porte, Ind.

Application March 5, 1957, Serial No. 644,043

10 Claims. (Cl. 32—64)

This invention relates to a dental appliance for use in the field of orthodontics and general dentistry.

In the profession of orthodontics, it is desirable that the patient's teeth to be straightened be spaced apart properly so that the usual bands, to which the usual arch is fastened, may be applied easily and quickly to the individual teeth. It is of extreme importance that the spreading or shifting of the teeth be a gradual one and without abrupt or rigorous application to the teeth. The shifting or spreading of the teeth is accomplished by effecting a gradual pressure against contiguous sides of adjacent teeth by means of the device or appliance of the invention.

The present invention comprises in general a small metal appliance or device for shifting or spreading teeth apart by causing a continuous pressure to be applied to adjacent or contiguous teeth so that the pressure against the adjacent teeth will cause the teeth to be spread or spaced, permitting the orthodontist to construct and apply bands easily to the teeth for ultimately fastening the arch to the bands.

The appliance consists primarily in an integral unitary structure having spaced tooth-engaging elements, such as extending prongs. The elements, or prongs, each have a proper configuration to allow the appliance to be applied between adjacent teeth to create a constant pressure against them. The appliance is designed to be worn for a predetermined length of time, to wit, four days to several weeks, to shift or spread gradually the adjacent teeth apart without causing any soreness to occur in the mouth, particularly to the teeth, gums, cheek, or tongue of the patient.

The primary object of the invention consists in the provision of a spring tension appliance, or device, adapted to be arranged or applied between adjacent teeth to effect a gradual pressure against adjacent teeth to cause the teeth to become shifted apart the proper distance so that the bands, which the orthodontist is to apply, may be properly constructed and applied to the individual teeth.

Another object of the invention is the provision of a new and novel device adapted to be arranged between adjacent molars, to create a continuous pressure against the teeth and thus, over a relatively short period of time, cause the teeth to spread apart the proper amount to allow access, to place interproximal fillings, or to permit bands for the teeth to be constructed and applied.

A further object consists in the provision of an appliance for causing teeth to be spread gradually apart, the appliance consisting in a unitary device preferably formed of spring metal wire looped about to form an eye or coil from which prongs extend, the prongs being spaced apart so that the spring wire material, when applied between teeth, will provide a spring pressure which works one tooth against an adjacent tooth to provide the proper space for the construction and application of bands to which the usual arch is applied.

A still further object of the invention relates to a spring metal device having elements or surfaces engaging adjacent teeth so that the spring pressure will work on one tooth against an adjacent tooth to cause separation between teeth, the separation coming from the mesial side of the device or appliance contacting the distal surface of the tooth mesial to the device, and the distal side of the other side of the device contacting the mesial surface of the tooth distal to the device.

A further object consists in the provision of a new and improved spring element which is adapted to be arranged between adjacent teeth and to create a spring pressure or force against adjacent teeth whereby the pressure works one tooth against the other.

Still another object of the invention lies in the provision of a new and improved method for causing separation between adjacent teeth by the application of a spring metal device arranged between adjacent teeth and causing a constant pressure to be exerted against the adjacent teeth.

Numerous other objects and advantages will be apparent throughout the progress of the specification which is to follow.

The accompanying drawing illustrates a selected embodiment of the invention, and the views therein are as follows.

Figure 1:
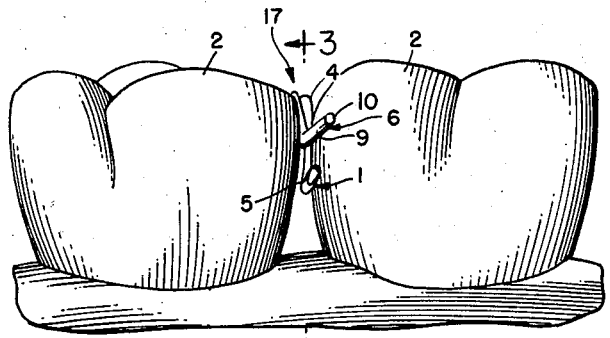
Fig. 1 is a detail vertical elevational view, on a greatly enlarged scale, of a pair of molars, looking from the lingual (tongue side of the mouth) toward the labial or buccal (cheek side) and having the invention applied thereto.

While the drawing shows the device applied to lower molars, it is capable of being applied to any other pair of teeth, including upper teeth, as well as lower teeth, the embodiment shown being merely for illustrative purposes.

The particular construction herein shown for the purpose of illustrating the invention comprises a dental appliance 1 which is adapted to be arranged between adjacent molars 2, 2 for the purpose of creating a continuous gradual pressure or force against the adjacent teeth 2 so as to spread the teeth apart to permit the usual bands (not shown) to be constructed and applied about the teeth, the bands later having the usual arch (not shown) attached thereto. The appliance 1 is adapted to be made of a single length of wire cut to the proper length and having the proper configuration so that the appliance will snap in place between adjacent teeth and create a continuous gradual pressure thereagainst, all without any painful results occurring either on the cheek, tongue or other parts of the mouth. The shape, size, style and configuration of the device is such that the device will snap into place between adjacent teeth, and when once so positioned, will remain in place without becoming shifted or creating any damage to the teeth or with any pain resulting to the mouth. The device, however, is capable of being snapped easily and quickly into and out of position by the orthodontist.

The device 1 is preferably made from a single length of wire 3 of the proper acceptable material, and is preferably round in cross section, although the cross section of the wire may be of any configuration necessary to carry out properly the function of the device in accordance with the contour or shape of the adjacent sides of the teeth. The device 1 consists in bending the wire 3 to provide a continuous coil or eye 4 from which there extends tooth engaging elements, such as projecting prongs 5 and 6. As shown in the drawing, the device is shown as applied to lower teeth, in which instance there is a projecting prong 5 and a projecting prong 6. The length of wire 3 may be coiled or looped about a center to provide an eye or coil 4 by looping, or partially winding, or curling the wire to make the prongs 5 and 6 as shown in Figs. 3 to 6, inclusive, particularly Fig. 5. The prong 6 has a relatively straight portion 7 extending from the coil or eye 4, and is curved intermediate its ends as indicated at 8, Fig. 5. The prong 6 then projects outwardly forwardly, as indicated at 9, terminating in a free end 10. The prong 5 is relatively curved, as indicated at 11, having its free outer end 12 positioned in the manner shown in Fig. 3.

Figure 4:
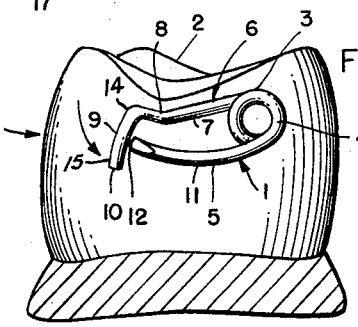
Fig. 4 is a view similar to Fig. 3, but showing the upper prong bent to its proper operative position.
Figure 5:
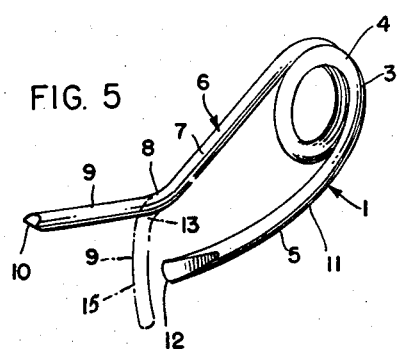
Fig. 5 is a detail perspective view of the appliance.

The prong 6 may be longer than the prong 5, the prong 6 being adapted to be bent downwardly, as at 14, to provide a leg or part 15, as indicated in full lines in Fig. 4 and in dotted lines in Fig. 5. The prong 5 is spaced apart a distance from the other prong 6. Also, the prongs 5 and 6 are spaced a predetermined distance apart laterally as clearly shown in Fig. 6, whereby the inside edge 6a of the prong 6 will be spaced from the inner side 16 of the prong 5, Fig. 6. The distance that the prongs 5 and 6 are spaced apart, when in applied operative position, is determined somewhat by the nature of the teeth 2. The inside edges 6a and 16 of the prongs 6 and 5 may be spread farther apart or closer together when the device is in place. In any event, the center of the prong 6 will be spaced from the center of the prong 5.

Usually, it is necessary that the prongs 5 and 6 be in the position shown in Fig. 5 before being inserted between the teeth. The extension part 9 of the prong 6 is bent over to the position indicated at 15, as shown in Fig. 4 and in dotted lines in Fig. 5.

Figure 3:
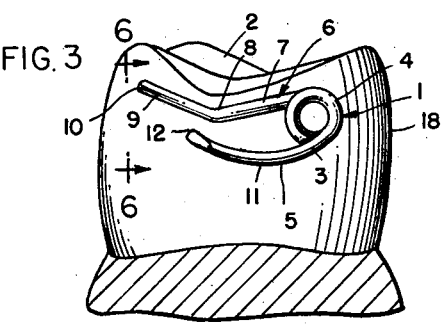
Fig. 3 is a detail vertical sectional view on the line 3—3 of Fig. 1.

The device comprising the orthodontic appliance is shown in the drawing as being greatly exaggerated. In actual practice, however, it is found that the entire length of the device is much shorter than the distance between the inside and outside of the teeth, that is, from the tongue side to the cheek side of the mouth. It is desirable that the eye 4 be positioned at the labial or buccal outside (cheek side) of the teeth with the leg 9 of the upper prong 6 bent over to provide the downwardly extending part 15 arranged on the lingual or inside of the mouth (the tongue side). The relative size and proportion of the device, with respect to the teeth, is shown in Figs. 3 and 4, both views being greatly exaggerated. Actually, the entire device is probably no longer than three-eighths of an inch from the outside of the eye to the tip 10 of the prong 6.

The prongs 5 and 6 engage the teeth 2 in such a manner that when the proper space is obtained, the appliance will not fall out, even though there remains only a little pressure, or no pressure.

Figure 2:
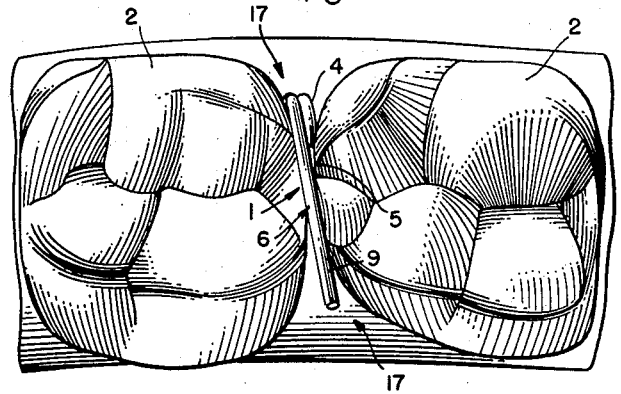
Fig. 2 is a detail top plan view thereof.

The eye or coil 4 prevents the device 1 from slipping out of place from the labial or buccal (cheek side) of the mouth, while the bent over part 15 of the extension 9 is bent gingivally and is located at the lingual (tongue side) of the mouth. The coil 4 engages the adjacent teeth, Fig. 2, and prevents the appliance from shifting in one direction, and the part 15 prevents shifting in the other direction. Vertical shiftable movement of the device is prevented because the upper prong 6 is arranged in the vally-like depression 17, Figs. 1 and 2, between the teeth occlusally to contact point, while the prong 5 fits gingivally to contact point, the bulging or ball-like part 18, Figs. 3 and 4, of the teeth normally contacting, Figs. 3 and 4. The appliance 1 is prevented from shifting horizontally either inwardly or outwardly as well as from shifting vertically. The prong 6 engages both teeth occlusally while the other prong 5 engages both teeth gingivally. Inasmuch as the eye 4 provides springiness, there will be a constant generally lateral pressure exerted against both teeth 2 by the appliance 1 tending to spread the teeth when the appliance is worn positioned in the patient's mouth.

Figure 6:
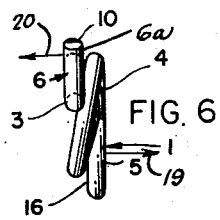
Fig. 6 is a detail elevational view of the appliance looking in the direction of the arrows 6—6 of Fig. 3.

The directional forces exerted by the prongs 5 and 6, being generated from the coil 4, are illustrated by the arrows 19 and 20, respectively, in Fig. 6.

The device or appliance 1 may be reversed, if practicable, so that the coil 4 will lie on the lingual (tongue side) of the mouth instead of on the labial or buccal (cheek side) as shown.

While the device or appliance 1 is relatively simple, extreme care must be used in making and fitting because of the nature of the device, its purpose, and its application to the teeth.

The size of the wire 3 is very small in diameter, the mean diameter being approximately twenty-five thousandths of an inch, but varies from approximately fifteen thousandths to thirty thousandths of an inch, according to the desired amount of separation. For example, a fifteen thousandth of an inch spring would create about seven thousandths of an inch separation, and a twenty-five thousandths of an inch spring would create about twelve thousandths of an inch separation.

The device is such that there is engagement between two adjacent teeth to create a force against the teeth, the tooth-engaging elements or prongs creating a spring pressure by virtue of the coil or eye which works on one tooth against its other adjacent tooth thereby causing the adjacent teeth contacted by the prongs to spread.

Changes may be made in the form, construction and arrangement of the parts without departing from the spirit of the invention or sacrificing any of its advantages, and the right is hereby reserved to make all such changes as fall fairly within the scope of the following claims.

The invention is hereby claimed as follows:

1. A dental appliance for creating a separation between adjacent teeth and comprising a spring metal element adapted to be arranged between said teeth, said element having horizontally and vertically spaced tooth engaging elements, one element engaging one tooth at one side thereof, and the other element engaging an adjacent tooth at the adjacent side thereof, said spring element being constructed and arranged to create a spreading pressure or force against said adjacent teeth.

2. A dental appliance adapted to be inserted between a pair of adjacent teeth to create a pressure against said adjacent teeth to separate the teeth, said appliance comprising a pair of horizontally and vertically spaced tooth engaging elements, one element being arranged on one side of an adjacent tooth, and the other element being adapted to be applied to the adjacent side of the other adjacent tooth to create a spring pressure against said teeth to ultimately spread the teeth apart so that bands may be constructed and applied to the individual teeth.

3. A dental appliance comprising a single piece of wire curled to provide an open eye with one prong projecting from one side of the eye, and a second prong projecting from the other side of the eye, said prongs being laterally and vertically spaced so that when the device is arranged between a pair of adjacent teeth one prong will engage a surface of one tooth and the other prong will engage the adjacent surface of its adjacent tooth.

4. A dental appliance comprising an upper prong, and a lower prong spaced from the upper prong both vertically and laterally, said prongs being integrally connected together by an eye formed by a continuation of the prongs, said prongs when applied between adjacent teeth creating a continuous gentle spreading pressure to be exerted against said teeth, said eye being arranged on the cheek side of the teeth and the free ends of the prongs each projecting toward the tongue side of the teeth, one prong extending between the teeth near their upper ends and the other prong extending between the teeth intermediate the upper side of the teeth and the gum.

5. A dental appliance comprising an upper prong, and a lower prong spaced from the upper prong both vertically and laterally, said prongs being integrally connected together by an eye formed by a continuation of the prongs, said prongs when applied between adjacent teeth creating a continuous gentle spreading pressure to be exerted against said teeth, said eye being arranged on the cheek side of the teeth and the free ends of the prongs each projecting toward the tongue side of the teeth, one prong extending between the teeth near their upper ends and the other prong extending between the teeth intermediate the upper side of the teeth and the gum, said upper prong having a leg bent therefrom extending inwardly and gingivally.

6. A dental appliance comprising a spring metal device adapted to be arranged between adjacent teeth to spread the teeth apart when the device is applied in position and creating a constant pressure against the adjacent faces of adjacent teeth, said device comprising horizontally and vertically spaced tooth contacting elements, one element being arranged near the occlusal or biting surface of the teeth, and the other element being arranged gingival to the occlusal surface of the teeth but occlusal to the gum.

7. A dental appliance comprising a spring metal device adapted to be arranged between adjacent teeth to spread the teeth apart when the device is applied in position and creating a constant pressure against the adjacent faces of adjacent teeth, said device comprising horizontally and vertically spaced tooth contacting elements, one element being arranged near the occlusal or biting surface of the teeth and the other element being arranged gingival to the occlusal surface of the teeth but occlusal to the gum, said elements being spaced for engagement with the contiguous sides of adjacent teeth to create a constant pressure against said adjacent teeth, one of said elements terminating a slight distance inwardly of the center of the teeth occlusal to the gum and gingival to the occlusal surface of the teeth, and the other element extending between the teeth and occlusally to the first element, a part of one element extending gingivally toward the gum of the mouth to prevent the appliance from shifting between the teeth in one direction, and means to prevent the appliance from shifting in the other direction.

8. A dental appliance comprising a single piece of springy wire coiled to provide an eye and having integral upper and lower vertically spaced prongs extending therefrom, the upper prong extending from the upper end of the eye and the lower prong extending from the lower end of the eye, said prongs being spaced apart laterally, said appliance adapted to be inserted between a pair of adjacent teeth with the eye arranged on one side of adjacent teeth and the prongs projecting from the opposite side, one of said prongs being positioned near the occlusal surface of the teeth and the other prong arranged gingivally to the first prong and between the contact area of the teeth and the gum.

9. A dental appliance comprising a single piece of springy wire coiled about itself to provide an eye and having integral upper and lower vertically spaced prongs extending therefrom, the upper prong extending from the upper end of the eye, and the lower prong extending from the lower end of the eye, said prongs being spaced apart laterally, said appliance adapted to be inserted between a pair of adjacent teeth with the eye arranged on one side of adjacent teeth and the prongs projecting from the opposite side, one of said prongs being positioned near the occlusal surface of the teeth and the other prong arranged gingival to the first prong and between the ordinary or normal contact area of the teeth and the gum, one of said prongs being bowed between its eye end and its free end, the other of said prongs being longer than the other prong and having a leg inclining toward said latter prong.

10. A dental appliance adapted to be inserted between a pair of adjacent teeth to create a pressure against adjacent teeth to ultimately spread the teeth so that bands may be constructed and applied to the individual teeth, said appliance comprising a single strand of wire looped to form an eye with prongs projecting from said eye, said prongs being spaced apart horizontally and vertically.

References Cited in the file of this patent

UNITED STATES PATENTS

| | | |
|---|---|---|
| 337,311 | Davis | Mar. 2, 1886 |
| 819,136 | Herman | May 1, 1906 |